United States Patent
Zechalko et al.

(10) Patent No.: US 10,910,905 B2
(45) Date of Patent: Feb. 2, 2021

(54) ELECTRIC MOTOR, IN PARTICULAR EXTERNAL ROTOR MOTOR, AND INTERMEDIATE INSULATING PART FOR AN ELECTRIC MOTOR

(71) Applicant: Ziehl-Abegg SE, Künzelsau (DE)

(72) Inventors: Paul Zechalko, Kupferzell (DE); Thorsten Sturm, Krautheim (DE)

(73) Assignee: Ziehl-Abegg SE, Künzelsau (DE)

( * ) Notice: Subject to any disclaimer, the term of this patent is extended or adjusted under 35 U.S.C. 154(b) by 517 days.

(21) Appl. No.: 15/127,429

(22) PCT Filed: Mar. 17, 2015

(86) PCT No.: PCT/EP2015/000581
§ 371 (c)(1),
(2) Date: Apr. 17, 2017

(87) PCT Pub. No.: WO2015/139831
PCT Pub. Date: Sep. 24, 2015

(65) Prior Publication Data
US 2017/0222514 A1    Aug. 3, 2017

(30) Foreign Application Priority Data
Mar. 20, 2014    (DE) .................. 10 2014 004 262

(51) Int. Cl.
*H02K 5/08*      (2006.01)
*H02K 11/00*    (2016.01)
(Continued)

(52) U.S. Cl.
CPC ............... *H02K 5/08* (2013.01); *H02K 5/10* (2013.01); *H02K 5/18* (2013.01); *H02K 11/0094* (2013.01);
(Continued)

(58) Field of Classification Search
CPC ........ H02K 5/08; H02K 11/0094; H02K 5/18; H02K 5/10; H02K 11/33; H02K 21/22; H02K 9/22
(Continued)

(56) References Cited

U.S. PATENT DOCUMENTS 4,840,222 A * 6/1989 Lakin ..................... H02K 11/33
                                                                    165/185
5,939,807 A * 8/1999 Patyk ..................... H02K 5/161
                                                                    310/64
(Continued)

FOREIGN PATENT DOCUMENTS

EP    1 361 644    11/2003
EP    1 701 431    9/2006
(Continued)

OTHER PUBLICATIONS

English translation of Best et al (EP 1361644 A2, IDS on Sep. 20, 2016), printed on Jul. 5, 2019.*
(Continued)

*Primary Examiner* — John K Kim
(74) *Attorney, Agent, or Firm* — Gudrun E. Huckett (57) ABSTRACT

The invention relates to an electric motor having a stator and an electronics compartment which receives electric/electronic structural parts. Said electric motor is accommodated in an electronics housing and can be closed by a housing cover. In order to maintain leakage paths and/or air paths between the housing cover and the electric/electronic structural parts, the electric motor has an intermediate insulating part (1) which is made of an electrically insulating plastic and has a supporting part as hard component and at least one soft component as sealing part (14, 25). The soft component is connected cohesively and/or by positive engagement to the hard component. The intermediate insulating part (1) has at least one pressing element (33) by which at least one
(Continued)

heat-generating structural part is pressed against a cooling surface. The intermediate insulating part (1) has a hood-shaped support which is made of a hard, electrically insulating plastic. At least one sealing part (14, 25) made of a soft component is connected to said support. Moreover, the intermediate insulating part (1) has at least one pressing element (33).

10 Claims, 9 Drawing Sheets

(51) Int. Cl.
*H02K 5/18* (2006.01)
*H02K 5/10* (2006.01)
*H02K 11/33* (2016.01)
*H02K 21/22* (2006.01)
*H02K 9/22* (2006.01)

(52) U.S. Cl.
CPC ............... *H02K 11/33* (2016.01); *H02K 9/22* (2013.01); *H02K 21/22* (2013.01)

(58) Field of Classification Search
USPC .................................... 310/52, 68 R, 71, 89
See application file for complete search history.

(56) References Cited

U.S. PATENT DOCUMENTS

| 6,809,543 | B1* | 10/2004 | Tustaniwskyj ..... G01R 31/2891 324/750.03 |
| 7,161,268 | B2* | 1/2007 | Kaiser ..................... H02K 9/22 310/64 |
| 9,025,336 | B2* | 5/2015 | Minato ................... H02K 3/522 361/730 |
| 9,124,155 | B2* | 9/2015 | Yamasaki ............ B62D 5/0406 |
| 9,124,160 | B2* | 9/2015 | Suga ...................... H02K 11/33 |
| 9,577,488 | B2* | 2/2017 | Sonoda .................. H02K 7/116 |
| 2006/0284499 | A1* | 12/2006 | Rubbo .................... H01L 25/11 310/68 D |
| 2013/0334906 | A1 | 12/2013 | Sonoda et al. |
| 2017/0222514 | A1* | 8/2017 | Zechalko ................. H02K 5/08 |

FOREIGN PATENT DOCUMENTS

EP       2 226 922       9/2010
WO       2009/075247     6/2009

OTHER PUBLICATIONS

English translation of Mikkelsen (EP 1701431 A1, IDS on Sep. 20, 2016), printed on Feb. 6, 2020. (Year: 2020).*
English translation of Best et al (EP 1361644 A2, IDS on Sep. 20, 2016), printed on Feb. 6, 2020. (Year: 2020).*

* cited by examiner

ELECTRIC MOTOR, IN PARTICULAR EXTERNAL ROTOR MOTOR, AND INTERMEDIATE INSULATING PART FOR AN ELECTRIC MOTOR

BACKGROUND OF THE INVENTION

The invention concerns an electric motor, in particular an external rotor motor, comprising a stator, an electronics chamber receiving electric/electronic components that is accommodated in an electronics housing and can be closed off by a housing cover, and comprising at least one intermediate insulating part for maintaining leakage and/or air paths between the housing cover and the electric/electronic components, as well as an intermediate insulating part for an electric motor, in particular for an external rotor motor, of the aforementioned kind.

In order to prevent electrical breakdown in electric motors, air and leakage paths are adjusted by means of an intermediate insulating part. In addition, the electric motor must also be sealed for which purpose sealing elements of elastomeric material, injection molded into the housing cover, or separate O-rings as sealing rings are used. Also, electric components in the electronics housing that must be cooled are pressed by metal clamps against a cooling surface in order to discharge the heat of this component into the cooling surface. Such an electric motor is however difficult to produce and to assemble because a plurality of components are required for the different functions.

The invention has the object to design the electric motor of the aforementioned kind and the intermediate insulating part of the aforementioned kind in such a way that a simple assembly and manufacture of an electric motor is possible in which not only the required air and leakage paths are maintained but which is also sealed sufficiently, and in which the heat which is produced by the electric components can be reliably discharged.

SUMMARY OF THE INVENTION

This object is solved for the electric motor of the aforementioned kind in accordance with the invention in that the intermediate insulating part is comprised of an electrically insulating plastic material and comprises a support part as a hard component and at least one soft component as a sealing part that is connected by material fusion and/or form fit to the hard component, and in that the intermediate insulating part is provided with at least one pressing element with which at least one heat-generating component is forced against a cooling surface, and for the intermediate insulating part of the aforementioned kind in accordance with the invention in that the intermediate insulating part comprises a hood-shaped support, which is comprised of a hard electrically insulating plastic material to which is connected at least one sealing part of a soft component by material fusion and/or by form fit, and further comprises at least one pressing element.

In the electric motor according to the invention, the intermediate insulating part forms a multi-functional component with which not only the required air and/or leakage paths can be maintained but with which also the required sealing action by means of the sealing part and the heat transfer from the component that is heating up to the cooling surface is ensured. The intermediate insulating part has the support part which is comprised of a hard component and therefore provides the intermediate insulating part with the required stability and strength. The sealing part is formed by the soft component which is connected by material fusion and/or form fit with the hard component. Finally, the intermediate insulating part has the at least one pressing element with which the heat-generating component is pressed against the cooling surface. In this way, the heat can be properly discharged from this component to the cooling surface. Therefore, only a single component is required in order to fulfill the different functions. The use of only a single component not only leads to reduced manufacturing costs but also material and assembly costs can be saved. Also, the risk of faulty assembly is reliably avoided.

Advantageously, the intermediate insulating part is provided at least across a portion of its circumference with a jacket that is provided at its free rim with the sealing part. Advantageously, this sealing part is provided about the entire circumference of the intermediate insulating part so that an optimal sealing action about the circumference of the electric motor is ensured.

In an advantageous embodiment, the gap between the rim of the housing cover and the stator is sealed by the sealing part. In this way it is prevented that dirt particles and/or moisture can enter the interior of the electric motor, in particular the electronics chamber, from the exterior through the gap.

In order to ensure an optimal sealing action, the sealing part engages around the free rim of the intermediate insulating part.

A reliable attachment of the sealing part is advantageously provided when the free rim of the intermediate insulating part is projecting past the exterior side of its jacket. Then, the sealing part can be attached to this projecting rim in such a way that the sealing part is reliably held.

In an advantageous embodiment, the intermediate insulating part is provided with at least one, preferably however a plurality of through openings for fastening screws with which, for example, the housing cover is attached to the stator with intermediate positioning of the intermediate insulating part. On the rim of the through opening, the sealing ring that is comprised of the soft component is provided which, in the mounted position, is contacting seal-tightly the fastening screw penetrating the through opening and thereby seals the through opening.

In order for the component to be reliably pressed against the cooling surface by the pressing element, it is advantageously embodied to be resiliently flexible. This has the effect that in the mounted position the pressing element is elastically deformed such that it exerts the required pressing force on the component.

Pressing the component against the cooling surface is even more improved when the pressing element is provided with at least one pressing nose. With it, the required high pressing force can be achieved in a targeted fashion.

The pressing nose is advantageously provided at its free end with a bevel. When the circuit board is mounted in the housing cover with the inserted intermediate insulating part, then the pressing nose strikes with its bevel the component to be pressure-loaded. The pressing element is elastically deformed thereby so that the pressing nose in the mounted position presses with sufficiently high force against the component. Also, the bevel facilitates positioning of the component to be pressure-loaded.

In a preferred embodiment, the pressing element is part of a wall which delimits a pocket for the component to be pressure-loaded. The component to be cooled is located in this pocket in the mounted position and is pressed by a portion of the boundary wall against the cooling surface.

The pressing element is advantageously positioned opposite the jacket of the housing cover at a radial spacing.

In an advantageous embodiment, the wall that is delimiting the pocket is formed by shaping the jacket of the intermediate insulating part.

In order for the pressing element to be sufficiently resiliently flexible, it is advantageously connected by webs to the wall of the intermediate insulating part. In this context, the webs are designed to be of a thin-walled configuration so that the required elastic deformation of the pressing element is possible in a simple way but does not turn into a plastic deformation.

In an advantageous embodiment, the cooling surface for the component to be cooled is formed by the jacket of the housing cover that is comprised of an appropriate material capable of absorbing heat, in particular of metal.

The intermediate insulating part according to the invention has the hood-shaped support which is comprised of hard, electrically insulating plastic material as a hard component. The sealing part, produced of a soft component, is joined by material fusion and/or form fit to this hard component. This soft component is advantageously injection molded onto the hard component. Moreover, the intermediate insulating part is provided with the at least one pressing element that is also comprised of the hard component. With this intermediate insulating part, different functions can therefore be fulfilled for which otherwise several components would be required.

The pressing element is advantageously part of a wall that delimits a pocket.

In a preferred embodiment, the pressing element is designed to be resiliently flexible. The pressing element in the mounted position is elastically deformed and generates the required pressing force on the component to be cooled. Also, due to the elastic deformation it is ensured that the required pressing force is acting on the component to be cooled even after an extended period of use of the intermediate insulating part.

Preferably, the pressing element is provided with at least one pressing nose with which a correspondingly high pressing force can be exerted on the component to be cooled.

The pressing nose is preferably provided on the free end with a bevel. Upon mounting, it strikes the component to be cooled. Upon being pushed farther, elastic deformation of the pressing element occurs.

The subject matter of the application not only results from the subject matter of the individual claims but also from all specifications and features disclosed in the drawings and the description. They are also claimed as being important to the invention, even if they are not subject matter of the claims, inasmuch as they are novel individually or in combination relative to the prior art.

The invention will be explained in more detail with the aid of an embodiment illustrated in the drawing. It is shown in.

BRIEF DESCRIPTION OF THE DRAWINGS

DESCRIPTION OF PREFERRED EMBODIMENTS

The intermediate insulating part 1 is used in electric motors and fulfills three functions. The first function resides in ensuring that the air and leakage paths (clearance and creepage distances) are maintained and in avoiding thereby electrical breakdown. The second function resides in sealing the electric motor against external influences. The third function of the intermediate insulating part 1 resides finally in pressing the electronic components arranged in an electronics chamber against cooling surfaces so that the heat produced in operation is reliably transferred from the respective electronic component onto the cooling surface. The intermediate insulating part 1 forms thus a multi-functional component that combines in it the described different functions. In this way, the configuration of the electric motor containing the intermediate insulating part 1 is simplified. Also, assembly is significantly simplified because it is not required to provide different components for the different functions. By use of the intermediate insulating part 1, all three aforementioned functions are fulfilled in a simple way.

Figure 7:
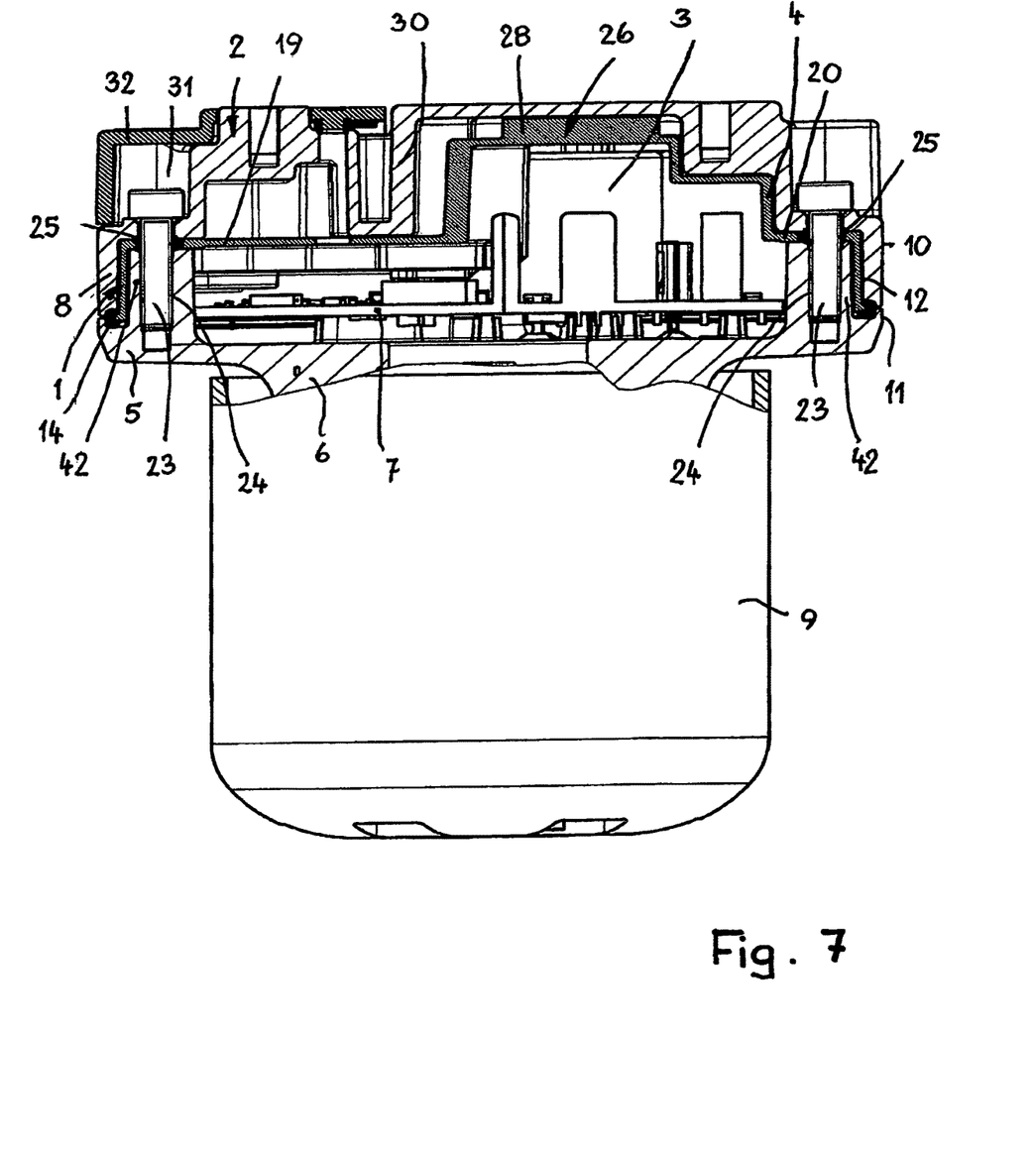
FIG. 7 in section view the intermediate insulating part according to the invention between a housing cover and a stator flange of an electric motor.

FIG. 7 shows in an exemplary way the mounted position of the intermediate insulating part 1. It is inserted into a housing cover 2 which is comprised of a metallic material and is of a hood-shaped configuration. The housing cover 2 closes off an electronics chamber 3 which is located in an electronics housing 4. In the illustrated embodiment, the electronics housing 4 is formed by a stator flange 5 and the housing cover 2 which is attached to the stator flange 5. It is part of a stator 6 which is surrounded by a rotor 9. The rotor 9 surrounds the stator in a cup shape.

The electronics housing 4 can also be a component that is separate from the stator flange 5 and is mounted in a known way on the stator flange.

At least one circuit board 7 is accommodated in the electronics chamber 3 and supports the electronic components required for operation of the electric motor, for example, rectifiers, diodes, and the like.

The housing cover 2 has a circumferentially extending jacket 8 that surrounds a jacket 12 of the intermediate insulating part 1 and is positioned with its exterior side 10 approximately at the level of the outer rim 11 of the stator flange 5.

Figure 1:
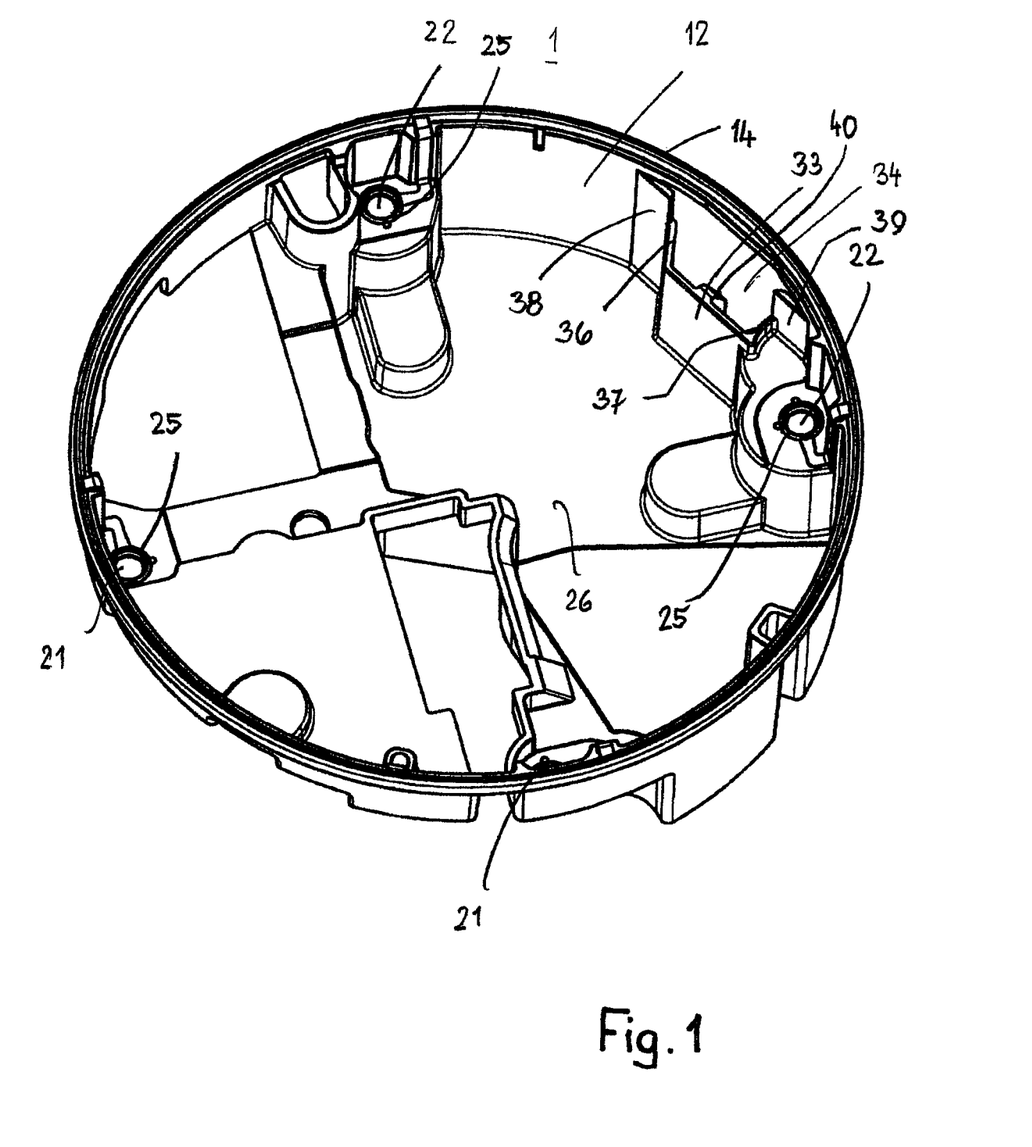
FIG. 1 in perspective illustration an intermediate insulating part according to the invention.
Figure 2:
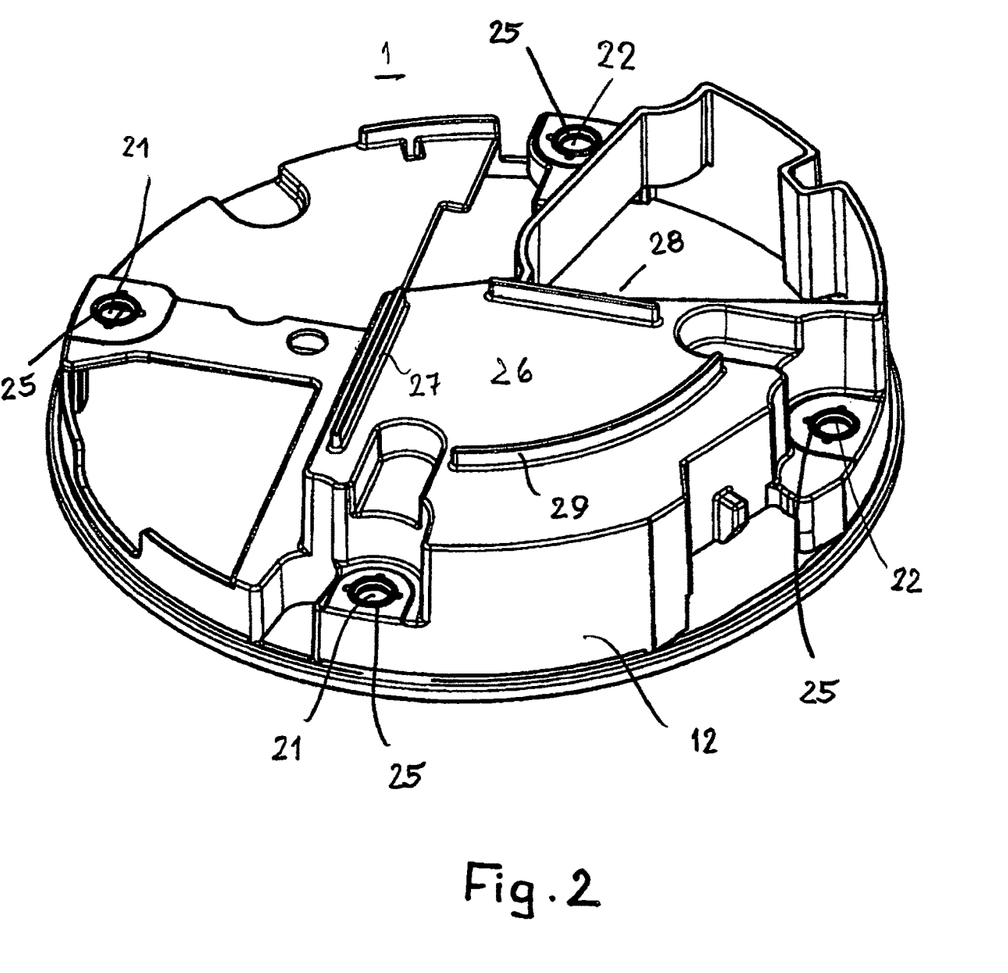
FIG. 2 the intermediate insulating part according to FIG. 1 in perspective view from the other side.

The jacket 12 is surrounded about its circumference by the jacket 8 of the housing cover 2 with formation of a minimal air gap. As can be seen in FIGS. 1 and 2, the jacket 12 has different heights about the circumference of the intermediate insulating part. The configuration of the jacket 12 depends on the configuration of the jacket 8 of the housing cover 2.

Figure 8:
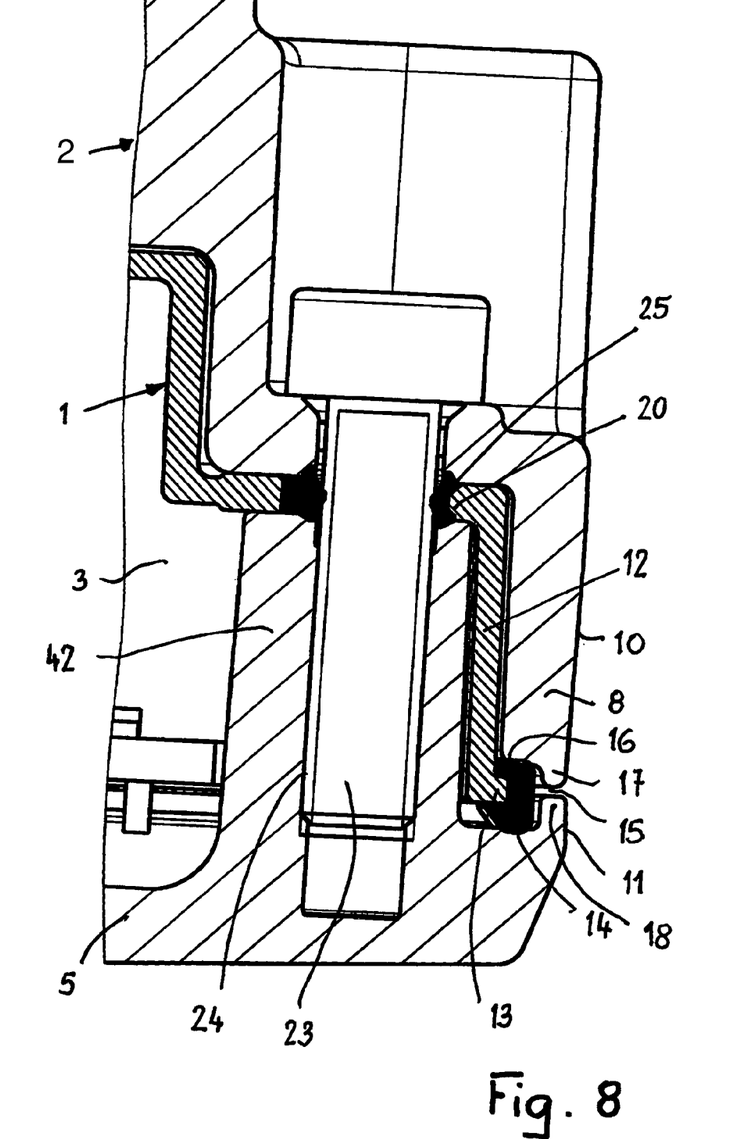
FIG. 8 a sealing action of the intermediate insulating part in enlarged illustration.

The intermediate insulating part 1 is comprised of a hard plastic material, for example, PET. On the free rim 13 of the jacket 12, a soft seal 14 is provided which extends about the circumference of the jacket 12 and seals the circumferential gap 15 (FIG. 8) between the free end of the jacket 8 of the housing cover 2 and the end face of the stator flange 5 in outward direction. The soft seal 14 is advantageously injection molded onto the jacket 12 and is comprised, for example, of TPE. In order to ensure a reliable hold of the soft seal 14 on the jacket 12, the free rim 13 of the jacket 12 is designed such that it projects radially outwardly. The soft seal 14 engages about this projecting rim 13 in a U-shape (FIG. 8). This configuration of the soft seal 14 has the advantage that, about the circumference of the jacket 12, a sealing ring is formed whose width is substantially greater than the width of the gap 15 to be sealed.

The connection between the intermediate insulating part and the soft seal 14 can also be designed with form fit.

The jacket 8 of the housing cover 2 is provided on its inner side with a circumferentially extending shoulder 16 which is delimited in radial outward direction by an axially projecting rim section 17. The stator flange 5 is provided at the radial outer rim with an annularly extending elevation 18 which is positioned axially opposite the rim section 17. Due to the two sections 17, 18, the soft seal 14 is shielded optimally in outward direction so that a damage of the soft seal in operation of the electric motor is prevented. In the mounted position, the soft seal 14 is axially elastically deformed between the bottom of the shoulder 16 and the stator flange 5, whereby an optimal sealing action is ensured.

The jacket 12 of the intermediate insulating part 1 is adjoined, about a portion of the circumference, by a wall section 19, 20 which is extending transversely, preferably perpendicularly, to it. In these wall sections, there are through openings 21, 22 for fastening screws 23 with which the housing cover 2 with intermediate positioning of the intermediate insulating part 1 is fastened on the stator flange 5. Support sleeves 42 are projecting away from the stator flange 5 and are advantageously formed monolithically with the stator flange 5, and the fastening screws 23 are screwed into them. The support sleeves 42 can be provided with threaded bores for the fastening screws 23. Instead of the threaded bores, the support sleeves 42 can also be provided with blind bores into which then self-tapping fastening screws 23 are screwed.

On the rim of the through openings 21, 22, a sealing ring 25 is provided, respectively, that is advantageously produced of the same soft material as the soft seal 14. With the sealing ring 25, the respective through opening 21, 22 is sealed in the mounted position of the housing cover 2. Since the sealing rings 25 are comprised of a soft component, the fastening screws 23 are sealed properly by the sealing rings 25 (FIGS. 7 and 8).

Figures 3, 4:
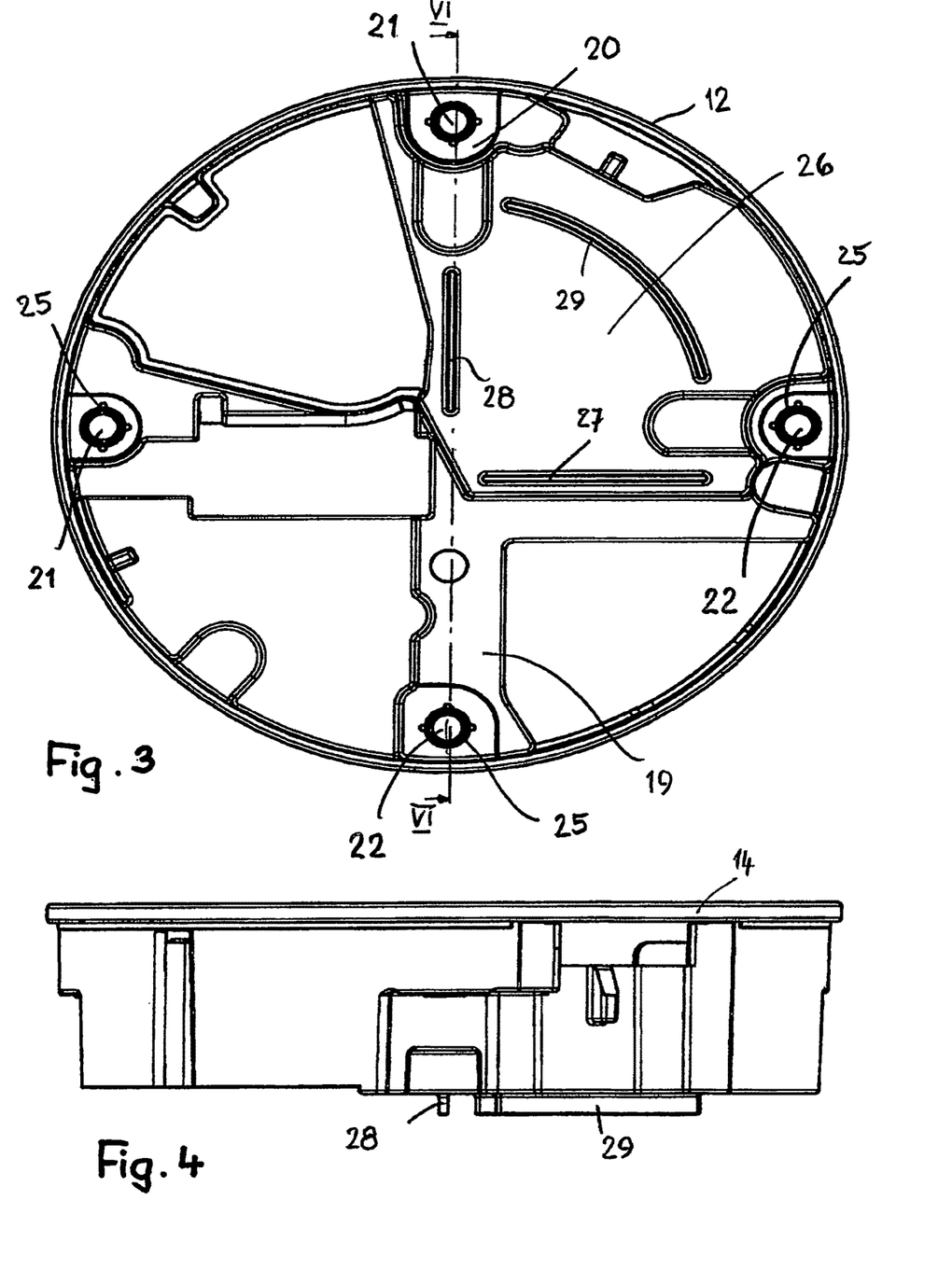
FIG. 3 a plan view of the intermediate insulating part.
FIG. 4 a side view of the intermediate insulating part according to FIG. 3.
Figure 5:
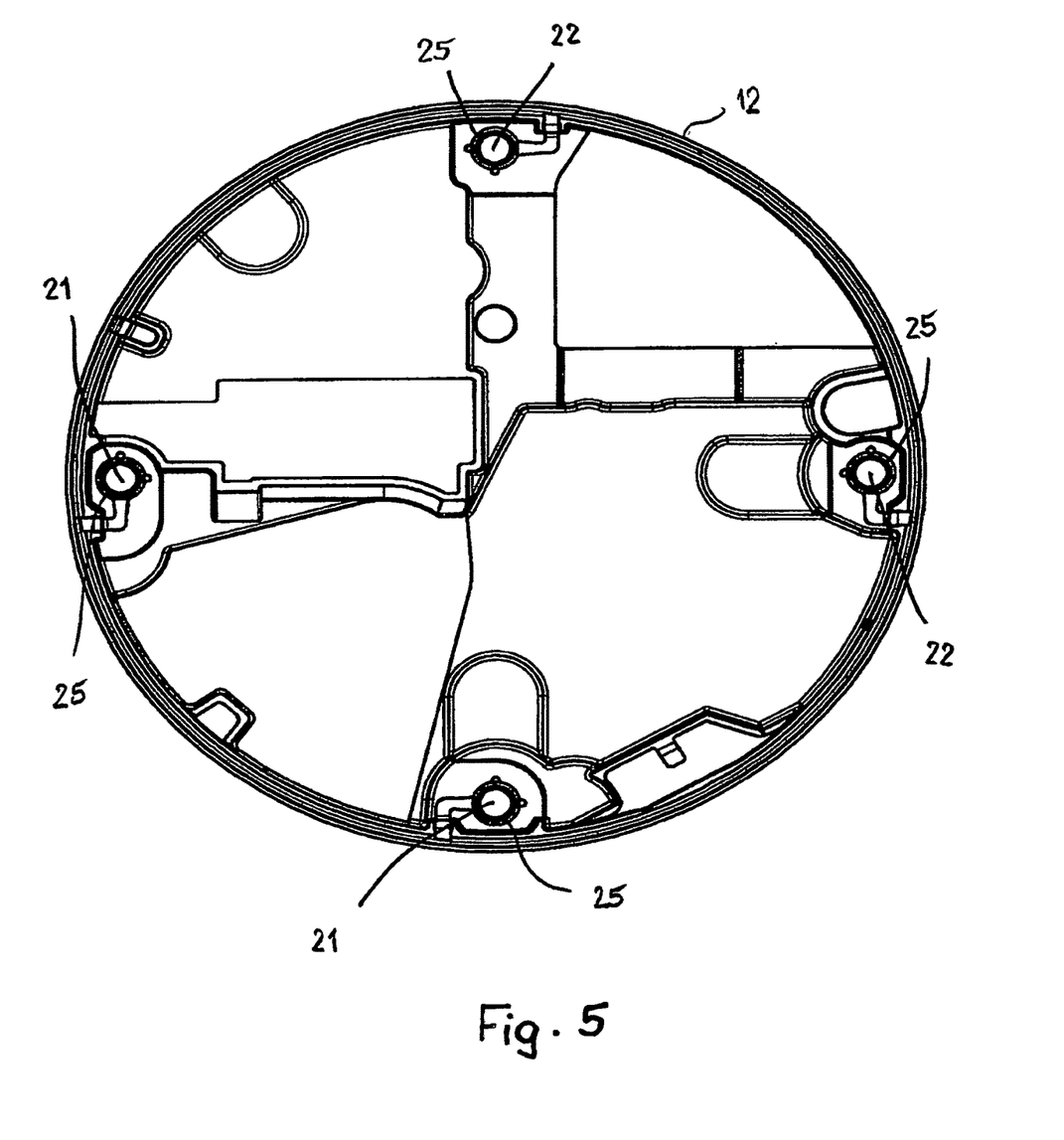
FIG. 5 a bottom view of the intermediate insulating part according to the invention.
Figure 6:
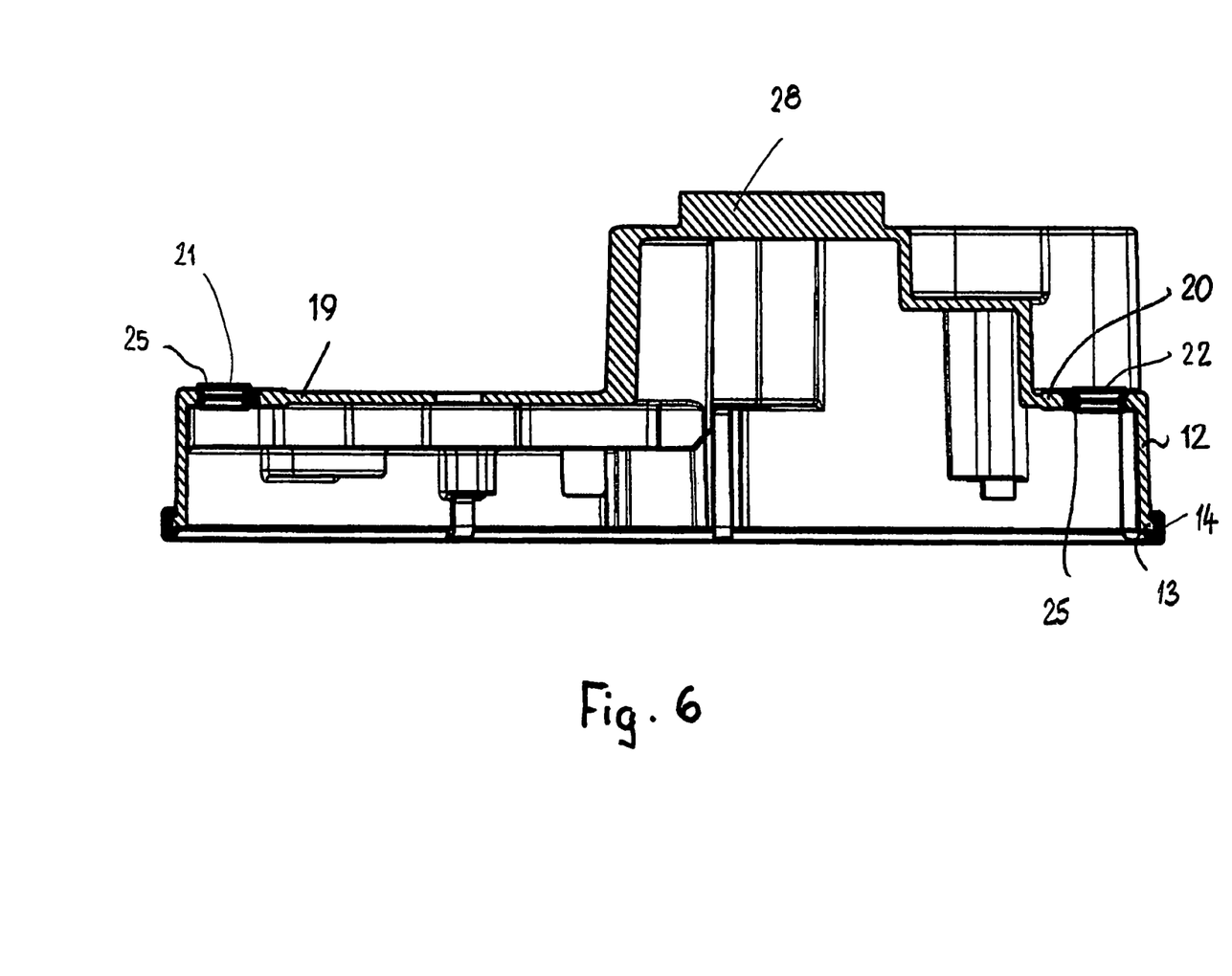
FIG. 6 in enlarged illustration a section along the line VI-VI in FIG. 3.

The position and arrangement of the wall sections 19, 20 depends on the inner configuration of the electronics chamber 3, i.e., on the arrangement of the electric or electronic components in the electronics chamber 3. In the exemplary embodiment, the intermediate insulating part 1 has a raised area 26 that is designed such that in the mounted position it is contacting the inner side of the housing cover 2 (FIG. 7). This raised area 26 extends approximately about an angular range of 90° and in plan view is designed like a sector (FIGS. 2 and 3). On this raised area 26, web-shaped projections 27 to 29 are provided (FIGS. 2 and 3) of which the projections 28, 28 extend straight and the projection 29 in an arc shape. The straight projections 27, 28 are positioned at a right angle relative to each other. In the mounted position, the intermediate insulating part 1 is resting with the projections 27 to 29 on the inner side of the housing cover 2 (FIG. 7). In the mounted position, the housing cover 2 presses against the projections 27 to 29 so that the intermediate insulating part 1 is forced fixedly into its mounted position.

The intermediate insulating part 1 is designed such that it is resting areally at least mostly on the inner side of the housing cover 2 (FIG. 7). In this context, the housing cover 2 is embodied in an exemplary fashion in such a way that it is contacting with its recessed area 30 the wall section 19 of the intermediate insulating part 1 and secures the latter additionally in the mounted position.

The housing cover 2 is provided with a recess 31 that is closed off by a cover part 32. The recess 31 can be used as a receiving space for additional components. The cover part 32 is connected detachably to the housing cover 2.

Figure 9:
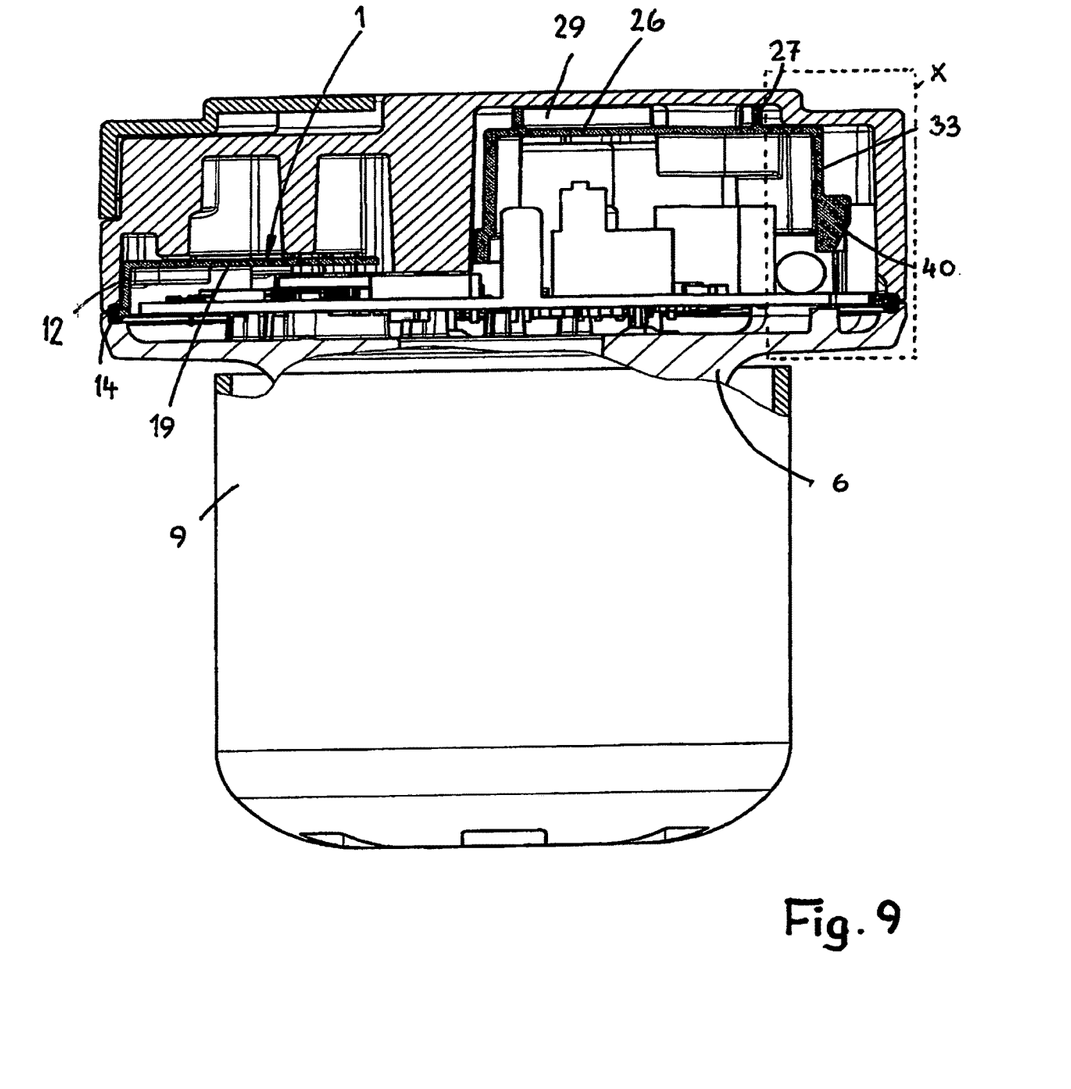
FIG. 9 a section view of the intermediate insulating part positioned between the housing cover and the stator flange.
Figure 10:
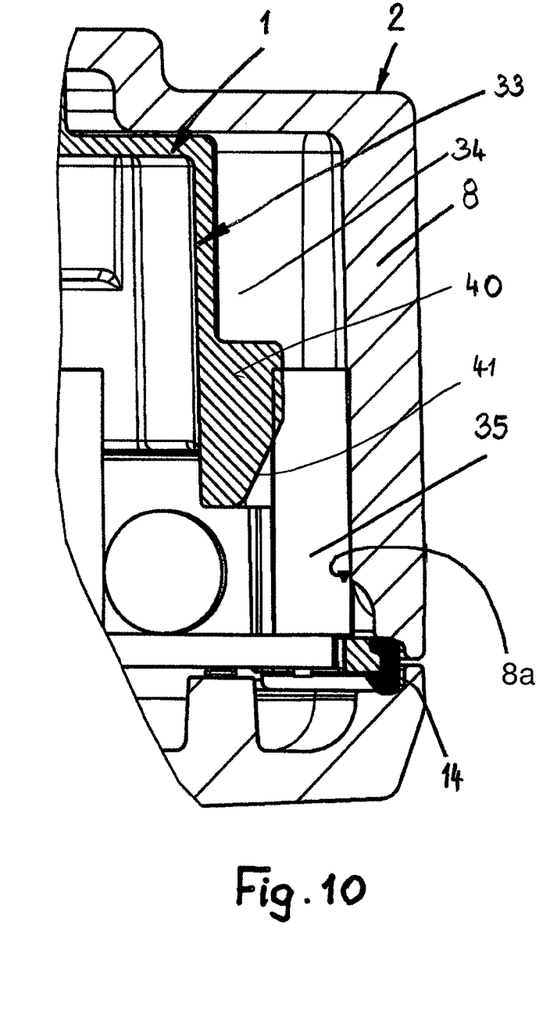
FIG. 10 the detail X of FIG. 9 in enlarged illustration.

The intermediate insulating part 1 serves not only for maintaining the air and leakage paths and for sealing the motor, but also for pressing electronic components against cooling surfaces. For this purpose, the intermediate insulating part 1 is provided with at least one pressing element 33 which will be described with the aid of FIGS. 9 to 11.

In the illustrated embodiment, the intermediate insulating part 1 comprises only a single such pressing element 33 (FIG. 1). Depending on the configuration of the electric motor, the intermediate insulating part 1 can be provided with additional pressing elements 33.

Figure 11:
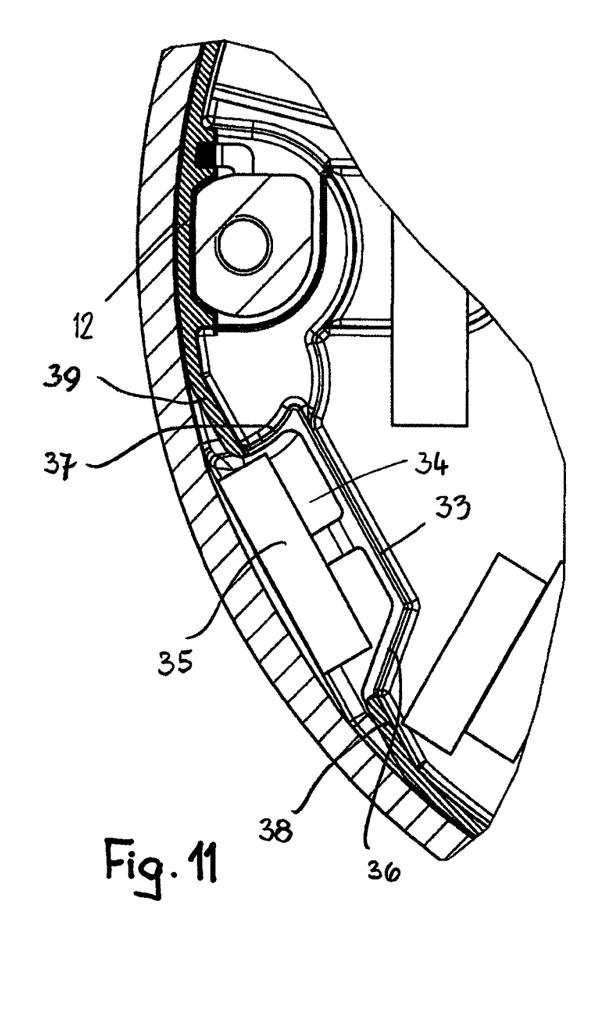
FIG. 11 in a radial section view and in enlarged illustration the pressing element of the intermediate insulating part according to the invention.

The pressing element 33 is arranged in the area of the jacket 12 of the intermediate insulating part 1 and delimits partially a pocket 34 in which the component 35 to be cooled is positioned in the mounted position. The pocket 34 has approximately a rectangular contour and is formed by a corresponding shaped portion of the jacket 12 of the intermediate insulating part 1. As can be seen in FIGS. 1 and 11, the pressing element 33 is positioned at a spacing relative to the jacket 12 within the intermediate insulating part 1 and is connected at its ends positioned in circumferential direction by a respective leg 36, 37 to the jacket 12.

The pressing element 33 and the legs 36, 37 have the same height and extend perpendicularly from the raised area 26. The leg 36 is positioned at an obtuse angle relative to the pressing element 33 while the oppositely positioned leg 37 is positioned at an acute angle relative to the pressing element 33. Both legs 36, 37 pass at their ends facing away from the pressing element 33 by means of an intermediate web 38, 39 into the jacket 12. As can be seen in FIG. 11, the intermediate webs 38, 39 adjoin at a large obtuse angle the jacket 12 of the intermediate insulating part 1.

The pressing element 33 and the legs 36, 37 are thin-walled components. The legs 36, 37 ensure that the pressing element 33 can provide an elastic spring action for applying pressure to the component 35. By means of the pressing element 33, the component 35 is forced against the inner wall of the jacket 8 of the housing cover 2 which is comprised of heat-conducting material, in particular metal. The jacket 8 forms the cooling surface 8a that absorbs the heat of the component 35. Since the component 35 is contacting the jacket 8 of the housing cover 2 under the force of the pressing element 33, an optimal heat transfer is ensured. The pressing element 33 is provided at its free rim at half the circumferential length with a pressure nose 40 which is projecting in the direction toward the jacket 8 of the housing cover 2 and is provided with a slanted portion 41 at its free end on the side which is facing the jacket 8.

During assembly, the intermediate insulating part 1 is inserted into the housing cover 2. Subsequently, the circuit board 7 with the electronic component 35 to be pressure-loaded is mounted. Upon insertion of the circuit board into the housing cover 2, the beveled portion 41 ensures reliably that the component 35 to be pressure-loaded reaches the pocket 34 provided for it. With the pressing nose 40 the component 35 is tightly pressed against the housing cover jacket 8 so that a good heat transfer from the component 35 to the jacket 8 is ensured.

The intermediate insulating part 1 enables also a tolerance compensation because it is made of the hard plastic material that allows for certain deformations upon installation of the intermediate insulating part 1. Since also the pressing element 33 is of a thin-walled configuration, it can also elastically deform to such an extent that the thicker pressing nose 40 presses the component 35 to be cooled with sufficient force against the jacket 8.

Since, by means of the intermediate insulating part 1, the required air and leakage paths are maintained and also the electric motor is sealed and electronic components are forced against cooling surfaces, a very inexpensive solution is provided because only a single component is provided for these three different functions. In addition, the risk of faulty assembly is reduced.

For heat transfer, the configuration can also be designed such that in the electronic chamber 3 separate cooling elements are provided. In this case, the component 35 to be cooled which is mounted on the circuit board 7 is also pressed by the pressing element 33 in the described way against the corresponding cooling element. Moreover, the intermediate insulating part 1 can have further pressing elements in order to force not only one but two or more components against cooling surfaces.

What is claimed is:

1. An electric motor comprising:
a stator;
an electronics housing comprising an electronics chamber and a housing cover comprised of metal, the housing cover closing off the electronics chamber;
at least one circuit board;
at least one heat-generating electronic component arranged on the at least one circuit board, wherein the at least one circuit board and the at least one heat-generating electronic component are arranged in the electronics chamber;
at least one intermediate insulating part provided between the housing cover and the at least one circuit board provided with the at least one electronic component, wherein the at least one intermediate insulating part is configured to maintain clearance and creepage distances and to prevent electrical breakdown;
the at least one intermediate insulating part comprised of an electrically insulating plastic material;
the at least one intermediate insulating part comprising a support part as a hard component and a sealing part comprised of a soft component and connected by material fusion and/or form fit to the support part, wherein the support part comprises a jacket extending at least about a portion of a circumference of the at least one intermediate insulating part, wherein the support part comprises wall sections adjoining transversely the jacket in an inward direction relative to the circumference, and wherein the sealing part includes a seal arranged at a free end of the jacket;
the at least one intermediate insulating part further comprising at least one pressing element;
wherein the at least one pressing element is positioned at a radial spacing opposite a jacket of the housing cover and is elastically deformed in a radial direction transverse to the jacket of the housing cover, wherein the at least one pressing element, due to the elastic deformation thereof in the radial direction, forces the at least one heat-generating electronic component in the radial direction toward the jacket of the housing cover against a cooling surface of a cooling element arranged in the electronics chamber and comprised of a heat-absorbing material.

2. The electric motor according to claim 1, wherein the seal seals a gap between a rim of the housing cover and the stator.

3. The electric motor according to claim 1, wherein the free end of the jacket of the at least one intermediate insulating part has a free rim and the seal engages about the free rim of the jacket of the at least one intermediate insulating part.

4. The electric motor according to claim 3, wherein the free rim of the jacket of the at least one intermediate insulating part is projecting outwardly past an exterior side of the jacket of the at least one intermediate insulating part.

5. The electric motor according to claim 1, wherein the at least one pressing element comprises at least one pressing nose.

6. The electric motor according to claim 1, wherein the wall delimiting the pocket is formed by shaping the jacket of the at least one intermediate insulating part.

7. The electric motor according to claim 1, wherein the at least one pressing element is connected by webs to the jacket of the at least one intermediate insulating part.

8. An electric motor comprising:
a stator;
an electronics housing comprising an electronics chamber configured to receive electric/electronic components and a housing cover closing off the electronics chamber;
at least one intermediate insulating part provided between the housing cover and the electric/electronic components and configured to maintain clearance and creepage distances;
the at least one intermediate insulating part comprised of an electrically insulating plastic material;
the at least one intermediate insulating part comprising a support part as a hard component and a sealing part comprised of a soft component and connected by material fusion and/or form fit to the support part, wherein the support part comprises a jacket extending at least about a portion of a circumference of the at least one intermediate insulating part, and wherein the sealing part includes a seal arranged at a free end of the jacket;
the at least one intermediate insulating part further comprising at least one pressing element configured to force at least one heat-generating component against a cooling surface;
wherein the at least one pressing element is part of a wall delimiting a pocket configured to accommodate the heat-generating component and wherein the at least one pressing element is positioned at a radial spacing opposite a jacket of the housing cover such that the at least one pressing element forces the heat-generating component against the jacket of the housing cover, wherein the jacket of the housing cover is the cooling surface;
wherein the at least one intermediate insulating part is provided with at least one through opening for a fastening screw, wherein the sealing part includes a sealing ring, wherein the at least one through opening has a rim, and wherein the sealing ring is arranged on the rim of the at least one through opening.

9. An electric motor comprising:
a stator;
an electronics housing comprising an electronics chamber configured to receive electric/electronic components and a housing cover closing off the electronics chamber;
at least one intermediate insulating part provided between the housing cover and the electric/electronic components and configured to maintain clearance and creepage distances;
the at least one intermediate insulating part comprised of an electrically insulating plastic material;
the at least one intermediate insulating part comprising a support part as a hard component and a sealing part comprised of a soft component and connected by material fusion and/or form fit to the support part, wherein the support part comprises a jacket extending at least about a portion of a circumference of the at least one intermediate insulating part, and wherein the sealing part includes a seal arranged at a free end of the jacket;
the at least one intermediate insulating part further comprising at least one pressing element configured to force at least one heat-generating component against a cooling surface;
wherein the at least one pressing element is part of a wall delimiting a pocket configured to accommodate the heat-generating component and wherein the at least one pressing element is positioned at a radial spacing opposite a jacket of the housing cover such that the at least one pressing element forces the heat-generating component against the jacket of the housing cover, wherein the jacket of the housing cover is the cooling surface;
wherein the at least one pressing element comprises at least one pressing nose and the at least one pressing nose has a free end provided with a bevel.

10. An electric motor comprising:
a stator;
an electronics housing comprising an electronics chamber and a housing cover comprised of metal, the housing cover closing off the electronics chamber;
at least one circuit board and at least one heat-generating electronic component arranged on the at least one circuit board, wherein the at least one circuit board and the at least one heat-generating electronic component are arranged in the electronics chamber;
at least one intermediate insulating part provided between the housing cover and the at least one circuit board provided with the at least one electronic component, wherein the at least one intermediate insulating part is configured to maintain clearance and creepage distances and to prevent electrical breakdown;
the at least one intermediate insulating part comprising at least one pressing element;
wherein the at least one pressing element is positioned at a radial spacing opposite a jacket of the housing cover and is elastically deformed in a radial direction transverse to the jacket of the housing cover, wherein the at least one pressing element, due to the elastic deformation thereof in the radial direction, forces the at least one heat-generating electronic component in the radial direction toward the jacket of the housing cover against a cooling surface of a cooling element arranged in the electronics chamber and comprised of a heat-absorbing material.

* * * * *